UNITED STATES PATENT OFFICE.

EARL B. GRAHAM AND RALPH E. KIRKHAM, OF BELLINGHAM, WASHINGTON.

PROCESS OF MANUFACTURING PASTRY-SHORTENING.

1,218,759.  Specification of Letters Patent.  Patented Mar. 13, 1917.

No Drawing.  Application filed January 17, 1917.  Serial No. 142,903.

*To all whom it may concern:*

Be it known that we, EARL B. GRAHAM and RALPH E. KIRKHAM, citizens of the United States, and residents of Bellingham, in the county of Whatcom and State of Washington, have invented certain new and useful Improvements in the Process of Manufacturing Pastry-Shortening, of which the following is a specification.

This invention relates to the method and process of manufacturing the pastry shortening described by us in an application for a patent filed by us on Dec. 14, 1916, Serial No. 136,894.

In said application we quite fully described the method used by us to produce said material and in this present application we will yet more completely set it forth.

We use two ingredients in our shortening viz.: beef oil and corn oil. To produce the beef oil we render selected beef suet in an open kettle and separate the oil from the residual solids by straining and pressing in the usual manner. For the corn oil we prefer to use a corn oil sold by the Corn Products Company of New York city under the name of Argo oil.

We combine said oils in the following manner: Beef oil and Argo oil, preferably in the proportion of two parts of said beef oil to three parts of said Argo oil, are mixed together in a suitable kettle while the temperature of the mixture is raised to about 240° F. Said mixture is then removed from said kettle and placed in a mechanical agitator with blades revolving on a vertical shaft and having a water cooled jacket and agitated therein and thereby until its temperature has fallen to about 95° F. The mixture is then removed and placed in another mechanical agitator the blades of which revolve on a horizontal shaft and agitated therein and thereby until it has been further cooled to a temperature of about 85° F., when the mixture is of a semi-fluid consistency. Said material is then removed from the second agitator and placed in the containers in which it is to be sold. Said filled containers are allowed to remain with their lids off for about ten hours or until the shortening is thoroughly cooled and solidified. Lids are then placed on the containers, when the material is ready for market.

We claim,—

1. The method and process of combining beef oil and corn oil consisting in mixing said oils in a vessel in which they are raised to a temperature of 240° F., mechanically agitating said mixture until its temperature falls to 85° F., placing said mixture in the containers in which it is to be sold, allowing the mixture to remain uncovered in said containers until it becomes thoroughly chilled and solidified, and then covering said containers.

2. The method and process of combining beef oil and corn oil consisting of placing said oils together in a vessel, raising the temperature of said oils to 240° F., thoroughly mixing said oils while hot, mechanically agitating said mixture in the presence of an artificial cooling medium until its temperature falls to 95° F., mechanically agitating said mixture in the absence of said artificial cooling medium until its temperature has fallen to 85° F., and placing said mixture in the containers in which it is to be sold.

3. The method and process of combining beef oil and corn oil consisting of placing said oils together in a vessel, raising the temperature of said oils to 240° F., thoroughly mixing said oils, mechanically agitating said mixture in the presence of a cooling medium until of a semi-fluid consistency, and placing said mixture in the containers in which it is to be sold.

Signed at Bellingham in the county of Whatcom and State of Washington this 11th day of January A. D. 1917.

EARL B. GRAHAM.
RALPH E. KIRKHAM.